G. N. HALL.
Horse Rake.
No. 26,396.
Patented Dec. 6, 1859.
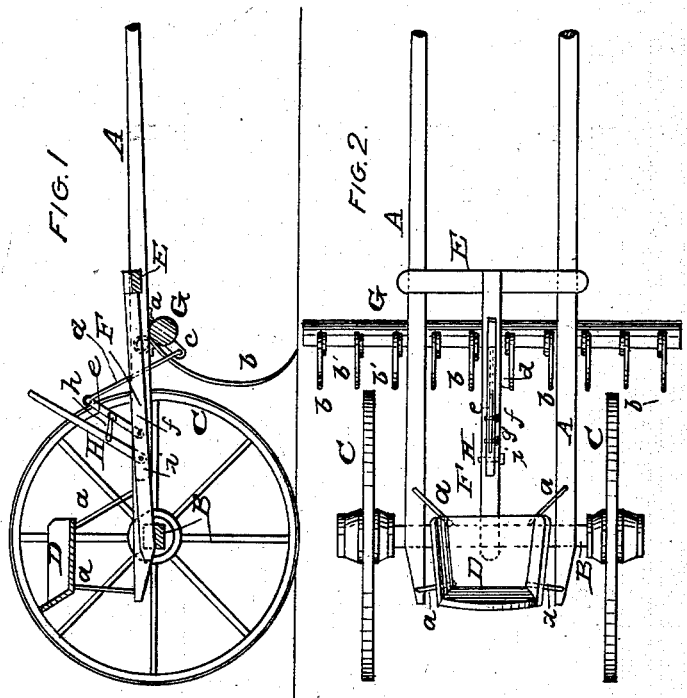
WITNESSES
INVENTOR
Geo N. Hall

UNITED STATES PATENT OFFICE.

GEORGE N. HALL, OF MAMAKATING, NEW YORK, ASSIGNOR TO HIMSELF, S. ARTHUR, J. PIERCE, AND S. D. ARTHUR.

IMPROVEMENT IN HORSE HAY-RAKES.

Specification forming part of Letters Patent No. 26,396, dated December 6, 1859.

*To all whom it may concern:*

Be it known that I, GEORGE N. HALL, of Mamakating, in the county of Sullivan and State of New York, have invented a new and Improved Horse-Rake; and I do hereby declare that the following is a full, clear, and exact description of the same, reference being had to the accompanying drawings, forming a part of this specification, in which—

Figure 1 represents a longitudinal vertical section of a horse-rake constructed according to my invention. Fig. 2 is a plan or top view of the same.

Similar letters of reference in both figures indicate corresponding parts.

The nature of my invention consists in the arrangement of the main lever, intermediate link, auxiliary lever, connecting-rod, crank-arm, rake-head, slotted brace-bar, and driver's seat in the manner and for the purpose hereinafter described. With my arrangement the weight of the rake-head is nearly balanced by the driver, and only one lever is necessary to hold the rake-head down and to elevate it. A spring catch or treadle is rendered unnecessary, as the main and auxiliary levers, by their gravity and the position they occupy, accomplish the office of the same, and also serve as a means whereby to elevate the rake-head. My arrangement also dispenses with the use of cog-wheels, which are expensive compared to a singe crank-arm, and are also liable to get out of order from the breaking of a tooth or other cause.

To enable those skilled in the art to fully understand, make, and use my invention, I will proceed to describe its construction and operation.

The thills A are secured to the axle B of the two wheels C in the usual manner; and secured to the rear end of the thills by four standards, a, is the driver's seat D, in such a position that the center of gravity of the occupant of the seat is somewhat behind the line drawn in a horizontal direction through the centers of the two wheels. The thills are connected by a cross-bar, E, from which a longitudinal beam, F, extends to the axle B, right in the center of the thills; and secured to the under side of the thills by means of loops a is the rake-head G, to which the teeth b are fastened in the usual manner. The rake-head G turns in the loops a, and it is in such a position that the rake-teeth b work close before the two wheels C. Secured to the under side of the rake-head, and in the middle of the same, is a short arm, c, which connects by means of a rod, d, with a lever, e, which turns on a pivot, f, in a slot, g, in the central beam, F; and this lever connects by means of a link, h, with a hand-lever, H, the fulcrum of which is on a pivot, i, in the slot g, and which can be reached from the driver's seat. The proportion of the arm c and of the levers e and H is such that it takes but little power to raise the rake, and as the latter is in close proximity to the wheels C the teeth b rise and fall with the wheels, and they can pass more easily over sudden depressions or cavities in the ground, and when it is desirable to depress the same with a sudden power this can easily be done by pressing against the hand-lever H.

The operation is as follows: The horse or draft animal is secured to the thills, and the rake-teeth are brought into such a position that they are somewhat inclined toward the wheels C, as clearly shown in Fig. 1. The driver assumes his seat, and by shifting in his seat nearer to or farther from the draft animal he is enabled to perfectly counterbalance the weight of the rake-head, and an experienced driver will be able to counterbalance the rake at all times by shifting his position according to the quantity of grass contained in the teeth. If the teeth are sufficiently filled, the lever H is pulled toward the driver's seat, whereby the teeth are raised up and the contents of the same is deposited on the ground. The teeth are so arranged on the rake-head that they clear the wheels when raised.

What I claim as my invention, and desire to secure by Letters Patent, is—

The arrangement of the main lever H, intermediate link, h, auxiliary lever e, connecting-rod d, crank-arm c, rake-head G b, and slotted brace-bar F, and driver's seat D, substantially as and for the purposes set forth.

GEO. N. HALL.

Witnesses:
 JOHN PARSELY,
 IRA WEED,
 GEORGE H. OLCOTT.